US012794394B2

(12) United States Patent
Morihashi et al.

(10) Patent No.: US 12,794,394 B2
(45) Date of Patent: Nov. 10, 2026

(54) MOTOR CONTROL DEVICE

(71) Applicant: FANUC CORPORATION, Yamanashi (JP)

(72) Inventors: Ryou Morihashi, Yamanashi (JP); Satoshi Ikai, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 217 days.

(21) Appl. No.: 18/699,421

(22) PCT Filed: Nov. 9, 2021

(86) PCT No.: PCT/JP2021/041148
§ 371 (c)(1),
(2) Date: Apr. 8, 2024

(87) PCT Pub. No.: WO2023/084587
PCT Pub. Date: May 19, 2023

(65) Prior Publication Data
US 2024/0413780 A1 Dec. 12, 2024

(51) Int. Cl.
*H02P 29/024* (2016.01)

(52) U.S. Cl.
CPC .................................. *H02P 29/024* (2013.01)

(58) Field of Classification Search
CPC ..................................................... H02P 29/024
(Continued)

(56) References Cited

U.S. PATENT DOCUMENTS 6,337,554 B1 * 1/2002 Voillat ...................... H02P 6/18 388/825
8,564,232 B2 * 10/2013 Sato .......................... H02P 6/12 318/400.11
(Continued)

FOREIGN PATENT DOCUMENTS

JP H06-335809 A 12/1994
JP H09-295247 A 11/1997
(Continued)

OTHER PUBLICATIONS

International Search Report issued in PCT/JP2021/041148; mailed Jan. 11, 2022.

*Primary Examiner* — David Luo
(74) *Attorney, Agent, or Firm* — Studebaker Brackett PLLC

(57) ABSTRACT

Provided is a technique capable of detecting an abnormality of an industrial machine when performing full-closed control on one axis by a plurality of motors in the industrial machine. This motor control device comprises: a first position acquiring unit for acquiring the position change of each motor on the basis of each of the detection signals of a plurality of first position detectors with which the plurality of motors are respectively provided; a second position acquiring unit for acquiring the position change of the one axis on the basis of the detection signal of a second position detector for directly detecting the position change of the one axis; a position calculation unit for calculating a position change of the one axis on the basis of the position change of each motor acquired by the first position acquiring unit; and an abnormality detection unit for detecting an abnormality of the industrial machine on the basis of the position change
(Continued)

of the one axis calculated by the position calculation unit and the position change of the one axis acquired by the second position acquiring unit.

5 Claims, 3 Drawing Sheets

(58) Field of Classification Search
USPC ............................... 318/400.21, 400.01, 700
See application file for complete search history.

(56) References Cited

U.S. PATENT DOCUMENTS

| | | | | |
|---|---|---|---|---|
| 9,654,032 | B2 * | 5/2017 | Barrass | H02P 7/298 |
| 10,411,621 | B2 * | 9/2019 | Hara | B62D 5/0463 |

FOREIGN PATENT DOCUMENTS

| | | | |
|---|---|---|---|
| JP | H10-254520 | A | 9/1998 |
| JP | 2008-289361 | A | 11/2008 |

* cited by examiner

MOTOR CONTROL DEVICE

TECHNICAL FIELD

The present invention relates to a motor control device.

BACKGROUND ART

Conventionally, technology has been disclosed for machining while moving the edge of a cutting tool in a U-axis direction orthogonal to the spindle, i.e. radial direction of rotation, in an industrial machine which performs boring or drilling, for example (for example, refer to Patent Document 1). According to this technology, machining of a tapered surface or curved surface is said to be possible in boring, drilling, and the like.

CITATION LIST

Patent Document

Patent Document 1: Japanese Unexamined Patent Application, Publication No. H6-335809

DISCLOSURE OF THE INVENTION

Problems to be Solved by the Invention

However, with the technology of Patent Document 1, testing to full-closed control the U axis by a plurality of motors has been done by the present applicants by providing a position detector to each motor and providing a position detector which directly detects the position in the U axis. In the conventional U-axis mechanism, if providing a scale to a machine end, since the cable of the scale becomes tangled and difficult to handle due to rotation of the axis, etc., full-closed control is not carried out. For this reason, in the case of full-closed controlling one axis by a plurality of motors in this way, the current situation is that a system capable of detecting abnormalities in an industrial machine has not been established.

The present disclosure has an object of providing technology capable of detecting abnormalities in an industrial machine when full-closed controlling one axis in the industrial machine by a plurality of motors.

Means for Solving the Problems

An aspect of the present disclosure relates to a motor control device for controlling one axis by a plurality of motors in an industrial machine, the motor control device including: a first position acquiring unit which acquires a positional change of each motor, based on respective detection signals of a plurality of first position detectors respectively provided to each of the plurality of motors; a second position acquiring unit which acquires positional change of the one axis based on a detection signal of a second position detector which directly detects positional change of the one axis; a position calculation unit which calculates positional change in the one axis, based on positional change of respective motors acquired by the first position acquiring unit; and an abnormality detection unit which detects abnormality in the industrial machine, based on positional change in the one axis calculated by the position calculation unit, and positional change in the one axis acquired by the second position acquiring unit.

Effects of the Invention

According to the present disclosure, it is possible to provide technology capable of detecting abnormalities in an industrial machine when full-closed loop controlling one axis in the industrial machine by a plurality of motors.

PREFERRED MODE FOR CARRYING OUT THE INVENTION

Hereinafter, embodiments of the present disclosure will be explained in detail by referencing the drawings. It should be noted that, in the explanation of a second embodiment, explanations for configurations shared with a first embodiment will be omitted as appropriate.

First Embodiment

An industrial machine according to a first embodiment includes a U-axis mechanism capable of moving an edge of a cutting tool in a U-axis direction orthogonal to a spindle, i.e. radial direction of rotation. For this reason, the industrial machine of the present embodiment is applicable to boring of drilling pipe, boring, etc., whereby machining of a curve, tapered surface, spherical surface, etc. is possible. In addition, the industrial machine of the present embodiment includes the motor control device described later, and full-closed controls the U-axis with a plurality of motors by way of the motor control device.

Figure 1:
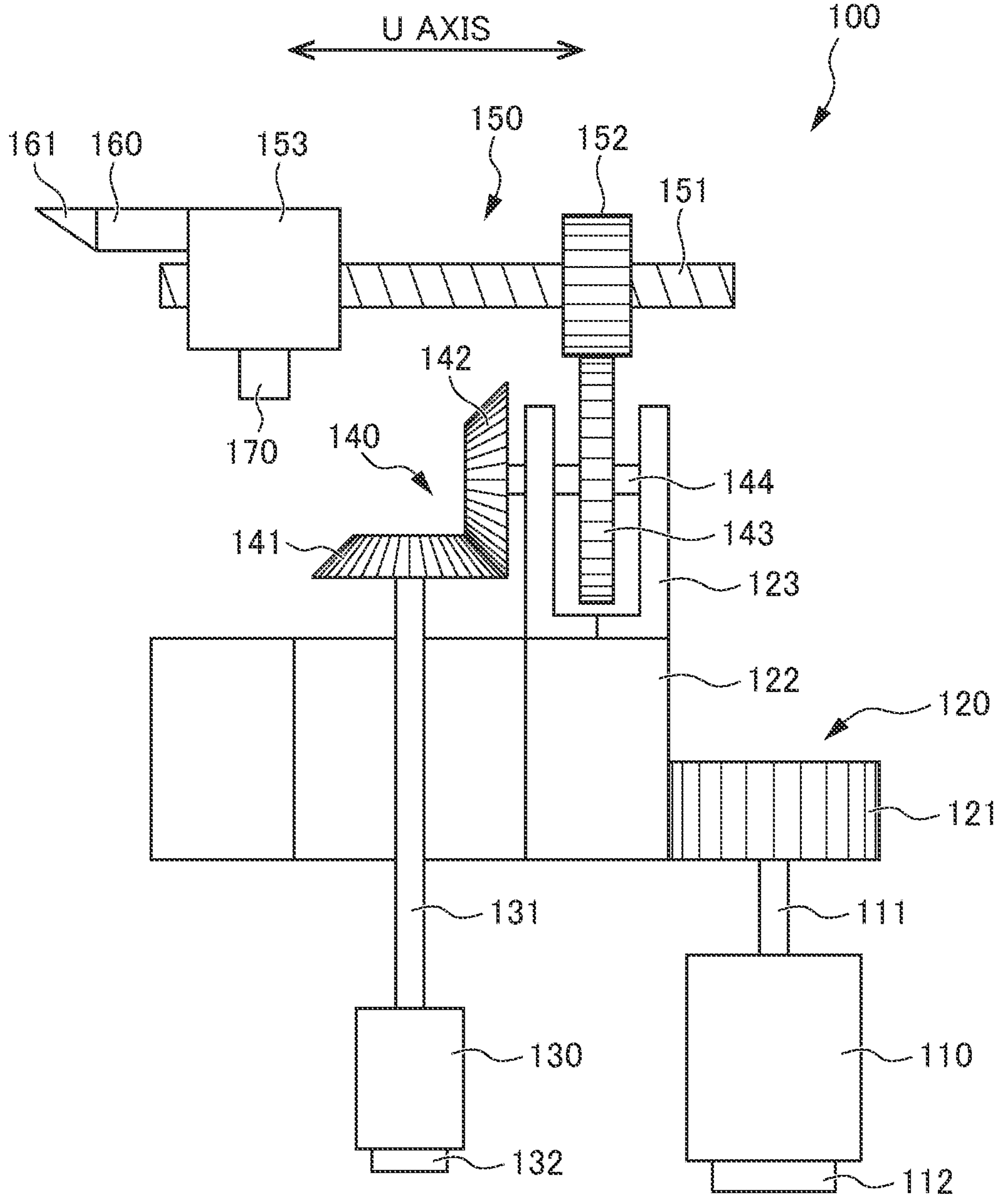
FIG. 1 is a view showing an industrial machine equipped with a U-axis mechanism according to a first embodiment.

FIG. 1 is a view showing an industrial machine 100 including a U-axis mechanism according to the first embodiment. As shown in FIG. 1, the industrial machine 100 of the present embodiment includes: a spindle motor 110, a spindle transfer mechanism 120, a U-axis motor 130, a U-axis transfer mechanism 140, a feed screw 150, a cutting tool 160, and a scale 170.

The spindle motor 110 causing the cutting tool 160 to rotate at high-speed by the rotational driving force thereof. The output shaft 111 of the spindle motor 110 is coupled to a spindle gear 121, and integrally rotates with a spindle gear 121.

A rotary encoder 112 serving as a first position detector is provided to the spindle motor 110. The rotary encoder 112 detects positional information such as the rotation angle, and position (angle) change of the spindle motor 110. A detection signal of the rotary encoder 112 is sent to the first position acquiring unit 11 of the motor control device described later.

The spindle transfer mechanism 120 transfers the rotational driving force of the spindle motor 110 to the cutting tool 160. The spindle transfer mechanism 120 includes the spindle gear 121, a base gear 122, and retaining section 123.

The spindle gear 121 is a spur gear which is cylindrical, and has tooth traces parallel to the spindle, as shown in FIG. 1. The spindle gear 121 is coupled with the output shaft 111 of the spindle motor 110, and meshes with the base gear 122. For this reason, the rotational driving force of the spindle motor 110 is transferred to the base gear 122 via the spindle gear 121 which rotates integrally with the output shaft 111.

The base gear 122 has a cylindrical shape, and the output shaft 131 of the U-axis motor 130 is inserted into a hollow part thereof. The tooth trace (not shown) is formed on the outer circumference of the base gear 122, and the base gear 122 is a spur gear which engages with the spindle gear 121.

The retaining section 123 is provided to the base gear 122, and rotates integrally with the base gear 122. The retaining section 123 retains the U-axis transfer mechanism 140, and retains the cutting tool 160 via the U-axis transfer mechanism 140 and the feed screw 150. More specifically, the retaining section 123 includes a pair of retainer plates 123*a*, 123*b* which are arranged to oppose each other as shown in FIG. 1, and a connecting shaft 144 of the U-axis transfer mechanism 140 is rotatably supported by this pair of retainer plates 123*a*, 123*b*.

The U-axis motor 130 causes the cutting tool 160 to move in the U-axis direction, by the difference in the mutual rotational driving force considering the gear ratio of the aforementioned or later described gears, with the spindle motor 110. In other words, with the U-axis motor 130, the rotation number thereof is controlled according to the rotation number of the spindle motor 110, and in the case of the rotational driving force from the U-axis motor 130 considering the gear ratio of the plurality of gears being the same as the rotational driving force by the spindle motor 110 considering the gear ratio of the plurality gears, the cutting tool 160 does not move in the U-axis direction, and the position in the U-axis direction becomes constant.

In addition, the output shaft 131 of the U-axis motor 130 is inserted in a hollow part of the base gear 122 and coupled to a first U-axis gear 141, and rotates integrally with the first U-axis gear 141.

The rotary encoder 132 serving as the first position detector is provided to the U-axis motor 130. The rotary encoder 132 detects the positional information such as the rotation angle, position (angular) change, etc. of the U-axis motor 130. The detection signal of the rotary encoder 132 is sent to a first position acquiring unit 11 of the motor control device described later.

The U-axis transfer mechanism 140 transfers the difference between the rotational driving force of the U-axis motor 130 and the rotational driving force of the spindle motor 110 to the feed screw 150. The U-axis transfer mechanism 140 includes a first U-axis gear 141, second U-axis gear 142, third U-axis gear 143, and connecting shaft 144.

The first U-axis gear 141 is coupled to the output shaft 131 of the U-axis motor 130, and rotates integrally with the output shaft 131. The second U-axis gear 142 meshes with the first U-axis gear 141, and is coupled to the coupling shaft 144 and rotates integrally with the coupling shaft 144. The third U-shaft gear 143 is coupled to the coupling shaft 144 and integrally rotates with the coupling shaft 144, and meshes with the feed screw gear 152. As shown in FIG. 1, the first U-axis gear 141 and second U-axis gear 142 are conically-shaped bevel gears, and the third U-axis gear 143 is a spur gear.

When there is no difference between the rotational driving force of the U-axis motor 130 considering the gear ratio of the plurality of gears, and the rotational driving force of the spindle motor 110 considering the gear ratio of the plurality of gears, the rotational driving force is not transferred and the third U-axis gear 143 does not rotate. In other words, only when there is a difference between the rotational driving force of the U-axis motor 130 considering the gear ratio of the plurality of gears, and the rotational driving force of the spindle motor 110 considering the gear ratio of the plurality of gears, the third U-axis gear 143 rotates by the rotational driving force being transferred.

The feed screw 150 converts the difference in rotational driving force of the spindle motor 110 transferred via the aforementioned plurality of gears and U-axis motor 130 to a U-axis direction linear drive force. The feed screw 150 is configured by a ball screw, for example. The feed screw 150 includes a screw shaft 151, feed screw gear 152 and nut 153.

The screw shaft 151 extends in a direction orthogonal to the U-axis direction, i.e. spindle. A spiral male thread is formed on the outer circumference of the screw shaft 151. In addition, the feed screw 152 is coupled, and the screw shaft 151 rotates integrally with the feed screw gear 152.

The feed screw gear 152 meshes with the third U-axis gear 143. The difference in the rotational driving forces of the spindle motor 110 and U-axis motor 130 considering the gear ratio of the plurality of gears is thereby transferred to the feed screw gear 152 via the third U-axis gear 143, and the screw shaft 151 rotates.

To a male thread formed on the outer circumference of the screw shaft 151, a female thread formed on the inner circumferential face of the nut 153 meshes via a ball (not shown) configured by a steel ball. The nut 153 thereby moves in the U-axis direction by the screw shaft 151 rotating. It should be noted that the nut 153 in the present embodiment functions also as a tool holder retaining the cutting tool 160.

The cutting tool 160 cuts a workpiece by the tool edge 161 thereof cutting the machining surface of the workpiece. The cutting tool 160 in the present embodiment moves in the U-axis direction by the aforementioned U-axis mechanism, while rotating at high-speed by the rotational driving force of the spindle motor 110, whereby boring and drilling become possible.

The scale 170 is provided as a second position detector, and is a separate detector mounted to the nut 153 as shown in FIG. 1, for example. The scale 170 directly detects positional information such as the position in the U-axis direction, and position change. The detection signal of the scale 170 is sent to the second position acquiring unit 12 of the motor control device described later.

The industrial machine 100 equipped with the above configuration operates as follows. First, when the rotational driving force of the spindle motor 110 is transferred by the spindle transmission 120, the entirety including the cutting tool 160, U-axis transmission 140 and feed screw 150 rotate at high speed. Boring and drill thereby become possible, for example.

At this time, the rotation number of the U-axis motor 130 is controlled so that the rotational driving force of the U-axis motor 130 considering the gear ratio of the plurality of gears and the rotational driving force of the spindle motor 110 considering the gear ratio of the plurality of gears match. When this is done, since the rotational driving force is not transferred to the third U-axis gear 143, the cutting tool 160 does not move in the U-axis direction, and is fixed at a certain position in the U-axis direction. For example, planar machining thereby comes to be performed in boring and drilling.

In contrast, the rotation number of the U-axis motor 130 is controlled so that a difference arises between the rotational driving force of the U-axis motor 130 considering the gear ratio of the plurality of gears and the rotational driving force of the spindle motor 110 considering the gear ratio of the plurality of gears. When this is done, the rotational driving force corresponding to this difference is transferred to the third U-axis gear 143, and converted into linear drive force by the feed screw 150, and the cutting tool 160 moves in the U-axis direction. For example, machining of a curve or tapered surface thereby comes to be performed in boring or drilling.

Next, a motor control device which full closed controls the industrial machine 100 of the present embodiment will be explained in detail.

Figure 2:
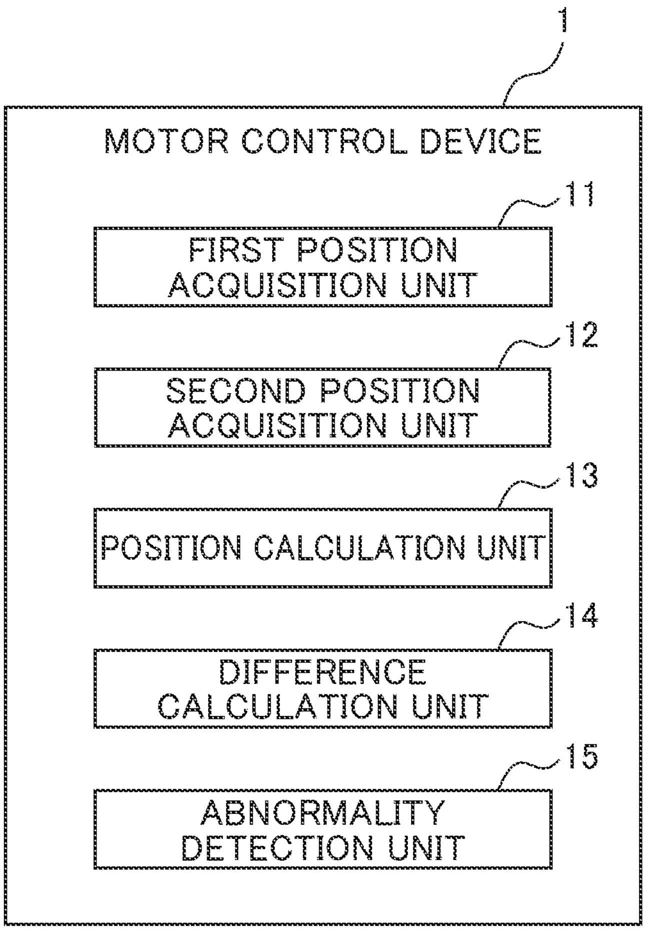
FIG. 2 is a block diagram showing a configuration of a motor control device.

FIG. 2 is a block diagram showing the configuration of a motor control device 1 according to the first embodiment. As shown in FIG. 2, the motor control device 1 according to the present embodiment includes a first position acquiring unit 11, second position acquiring unit 12, position calculation unit 13, difference calculation unit 14, and abnormality detection unit 15.

The first position acquiring unit 11 acquires positional information such as the positional change (speed) of the spindle motor 110 (hereinafter referred to simply as positional change), based on the detection signal of the rotary encoder 112 provided to the spindle motor 110. In addition, the first position acquisition part 11 acquires the positional information such as the positional change (speed) of the U-axis motor 130 (hereinafter referred to simply as positional change), based on the detection signal of the rotary encoder 132 provided to the U-axis motor 130.

The second position acquiring unit 12 acquires the positional information such as the positional change of the U axis (speed) based on the detection signal of the scale 170 directly detecting the positional change of the U axis.

It should be noted that the detection signals of the rotary encoder 112 and rotary encoder 132 inputted to the first position acquiring unit 11, and the detection signal of the scale 170 inputted to the second position acquiring unit 12 are inputted synchronously at a predetermined control cycle.

The position calculation unit 13 calculates the positional change of the U axis based on the positional change of the spindle motor 110 and positional change of the U-axis motor 130 acquired by the first position acquiring unit 11. More specifically, the position calculation unit 13 calculates the positional change of the U axis based on the gear ratio of the aforementioned gears and the lead of the feed screw 150, in addition to the positional change of the spindle motor 110 and positional change of the U-axis motor 130. Herein, when the screw shaft 151 rotates once, the lead of the feed screw 150 indicates the distance by which the nut 153 moves in the U-axis direction.

The difference calculation unit 14 calculates the difference between the positional change of the U axis calculated by the position calculation unit 13, and the positional change of the U axis directly acquired by the second position acquiring unit 12. It should be noted that, at this time, the positional change of the U axis calculated by the position calculation unit 13 is the change calculated from the positional change of each motor acquired synchronously with the positional change of the U axis acquired directly by the second position acquiring unit 12.

The abnormality detection unit 15 detects abnormalities in the industrial machine 100, based on the positional change of the U axis calculated by the position calculation unit 13, and positional change of the U axis acquired directly by the second position acquiring unit 12. More specifically, the abnormality detection unit 15, in the case of the difference calculated by the difference calculation unit 14 being outside a predetermined range, or in a case of the absolute value of the difference calculated by the difference calculation unit 14 exceeding a predetermined threshold, detects as an abnormality of the industrial machine 100. As the predetermined range or predetermined threshold, an appropriate range or value is set as a parameter after confirming the calculation error by experiments or the like in advance. The parameter may be written in the machining program, or may be inputted by the operator using the motor control device 1.

It should be noted that, as abnormalities of the industrial machine 100, failure of the position detector of any of the rotary encoder 112 of the spindle motor 110, rotary encoder 132 of the U-axis motor 130 and scale 170 of the U axis can be exemplified. In addition, as abnormalities of the industrial machine 100, for example, a case of the gears among any of the plurality of gears not meshing together or the like can be exemplified.

In addition, the abnormality detection unit 15 is configured so as to produce an alarm when detecting abnormality in the industrial machine 100. For example, the abnormality detection unit 15, when detecting abnormality in the industrial machine 100, displays that the abnormality generated in the industrial machine 100, on the display screen (not shown) of the motor control device 1 or the like, in addition to illuminating a warning lamp or generating a warning sound to notify the user.

With the motor control device 1 according to the present embodiment including the above configuration, abnormality detection processing is performed in the following such order, upon full closed controlling the industrial machine 100.

First, by the first position acquiring unit 11, the positional change in the spindle motor 110 is acquired based on the detection signal of the rotary encoder 112 provided to the spindle motor 110, and the positional change of the U-axis motor 130 is acquired based on the detection signal of the rotary encoder 132 provided to the U-axis motor 130.

Next, the positional change of the U axis is acquired by the second position acquiring unit 12 based on the detection signal of the scale 170 directly detecting the positional change of the U axis.

Next, the positional change of the U axis is calculated by the position calculation unit 13, based on the positional change of the spindle motor 110 and positional change of the U-axis motor 130 acquired by the first position acquiring unit 11.

Next, the difference between the positional change of the U axis calculated by the position calculation unit 13, and the positional change of the U axis acquired directly by the second position acquiring unit 12 is calculated by the difference calculation unit 14.

Then, in a case of the absolute value for the difference calculated by the difference calculation unit 14 exceeding a predetermined threshold, abnormality in the industrial machine 100 is detected by the abnormality detection unit 15. Abnormality detection processing is executed by configuring in the above way.

According to the present embodiment, the following effects are exerted.

With the motor control device 1 according to the present embodiment, the position calculation unit 13 is provided which calculates the positional change of the U axis, based on the positional change of the spindle motor 110 and positional change of the U-axis motor 130 acquired by the first position acquiring unit 11. In addition, with the motor control device 1 according to the present embodiment, the abnormality detection unit 15 is provided which detects abnormality in the industrial machine 100 based on the positional change of the U axis calculated by the position calculation unit 13, and the positional change of the U axis acquired directly by the scale 170 acquired by the second position acquiring unit 12.

According to the present embodiment, also in the case of full closed controlling one axis (U axis) by a plurality of motors in the industrial machine 100, it is thereby possible to reliably detect abnormality in the industrial machine 100. Therefore, according to the present embodiment, it is possible to reliably avoid failure in the industrial machine 100.

In addition, with the motor control device 1 according to the present embodiment, the difference calculation unit 14 is provided which detects the difference between the positional change of the U axis calculated by the position calculation unit 13, and the positional change of the U axis acquired directly by the scale 170 acquired by the second position acquiring unit 12. Furthermore, with the motor control device 1 according to the present embodiment, in the case of the difference calculated by the difference calculation unit 14 being outside a predetermined range, or in a case of the absolute value of the difference calculated by the difference calculation unit 14 exceeding a predetermined threshold, it is configured to detect abnormality in the industrial machine 100 by the abnormality detection unit 15.

According to the present embodiment, it is thereby possible to more reliably detect abnormalities in the industrial machine 100, and possible to more reliably avoid failure of the industrial machine 100.

In addition, with the motor control device 1 according to the present embodiment, it is configured to produce an alarm when detecting abnormality in the industrial machine 100 by the abnormality detection unit 15. It is thereby possible to notify the user at an early stage of abnormality in the industrial machine 100, and thus possible to prompt the user at an early stage to stop and handle the failure of the industrial machine.

In addition, with the motor control device 1 according to the present embodiment, it is configured to calculate the positional change of the U axis based on the gear ratio of the plurality of gears and the lead of the feed screw, in addition to the positional change of the spindle motor 110 and positional change of the U-axis motor 130. It is thereby possible to calculate the positional change of the U axis more accurately, and possible to detect abnormality in the industrial machine 100 more precisely.

Second Embodiment

Figure 3:
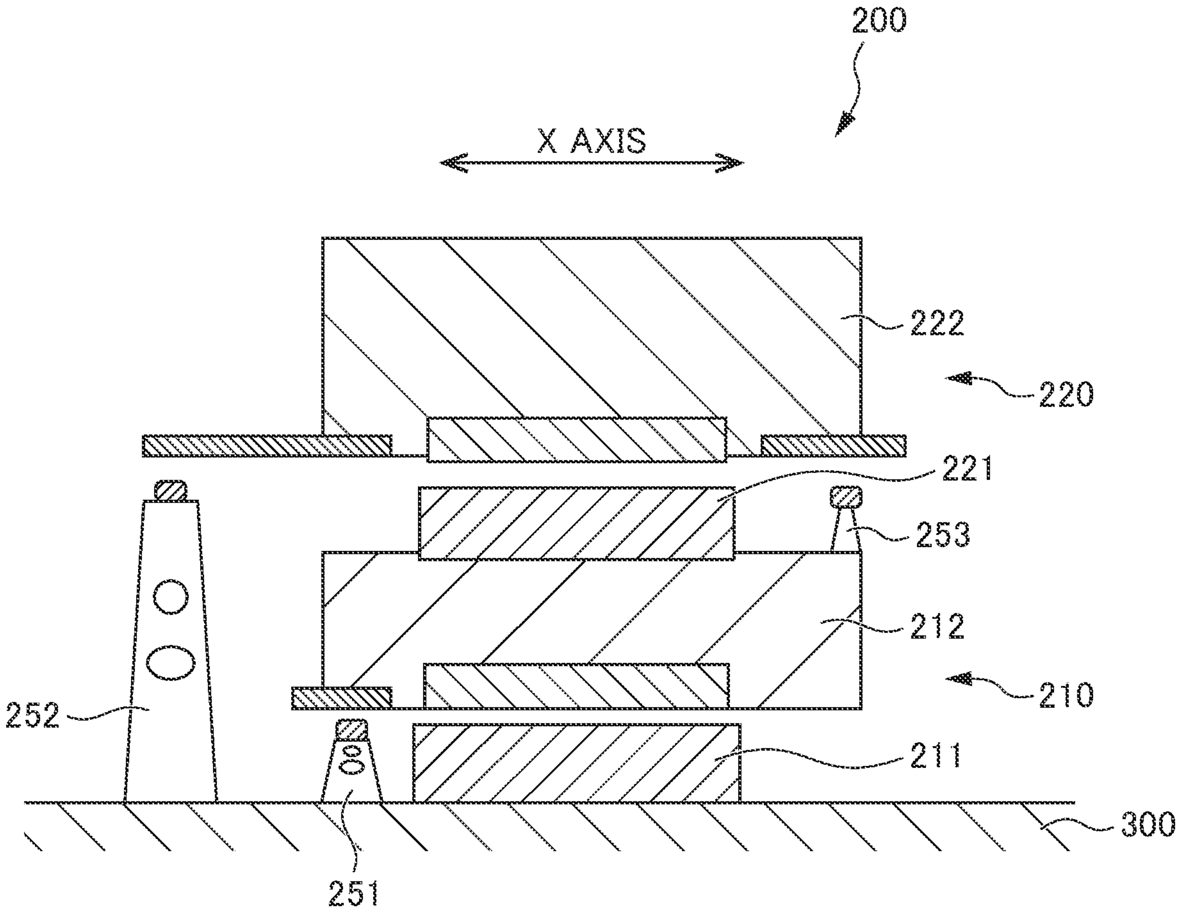
FIG. 3 is a view showing an industrial machine equipped with a linear mechanism according to a second embodiment.

FIG. 3 is a view showing an industrial machine 200 including a linear mechanism according to a second embodiment. As shown in FIG. 3, the industrial machine 200 according to the present embodiment includes a linear mechanism stacking the two stages of linear motors 210 and 220, as well as including a cutting tool (not shown) at an upper linear motor 220. For this reason, it is possible to linearly move the edge of a cutting tool in one predetermined axial direction, the X-axis direction in the example shown in FIG. 3, in response to the relative position of the linear motors 210 and 220. In addition, the industrial machine 200 according to the present embodiment includes the motor control device 1 similarly to the first embodiment, and full closed controls the cutting tool by the linear motors 210 and 220 in the X-axis direction by way of the motor control device 1.

As shown in FIG. 3, the industrial machine 200 according to the present embodiment includes the linear motor 210 as a damper axis provided on the machine base 300, and the linear motor 220 as a linear axis provided on the linear motor 210.

The linear motor 210 includes a damper fixed part 211 provided on the machine base 300, and a damper mobile part 212 which performs reciprocating motion in the X-axis direction along the linear guide provided to the damper fixed part 211.

The linear motor 220 includes a linear fixed part 221 provided on the damper mobile part 212, and a linear mobile part 222 which performs reciprocating motion in the X-axis direction along the linear guide provided on the linear fixed part 221.

In addition, the industrial machine 200 according to the present embodiment includes a first linear scale 251 and second linear scale 252 as a first position detector, and a third linear scale 253 as a second position detector.

The first linear scale 251 as the first position detector is provided on the machine base 300. The first linear scale 251 detects the positional information such as positional change in the X-axis direction of the linear motor 210. The detection signal of the first linear scale 251 is sent to the first position acquiring unit 11 of the motor control device 1.

The second linear scale 252 as the first position detector is provided on the machine base 300. The second linear scale 252 detects the positional information such as positional change in the X-axis direction of the linear motor 220. The detection signal of the second linear scale 252 is sent to the first position acquiring unit 11 of the motor control device 1.

The third linear scale 253 as the second position detector is provided on a damper mobile part 212. The third linear scale 253 detects the positional change of the relative position in the X-axis direction of the linear motors 210, 220. The detection signal of the third linear scale 253 is sent to the second position acquiring unit 12 of the motor control device 1.

In other words, the first position acquiring unit 11 acquires the positional change relative to the machine base 300 for the mobile parts of the plurality of linear motors. The second position acquiring unit 12 acquires the relative positional change for the mobile parts of the plurality of linear motors. Then, the position calculation unit 13 calculates the relative positional change in the mobile parts of the plurality of linear motors, based on the positional change of the mobile parts of the plurality of linear motors relative to the machine base acquired by the first position acquiring unit 11.

The industrial machine 200 according to the present embodiment including the above configuration is full closed controlled by the motor control device 1 as described above. In addition, at this time, the abnormality detection processing is performed in the following such sequence. It should be noted that, in the present embodiment, in the acquired information of the motor control device 1, the positional change of the spindle motor 110 and positional change of the U-axis motor 130 according to the first embodiment are replaced by the positional change in the X-axis direction of the linear motors 210, 220, and the positional change of the U-axis motor 130 according to the first embodiment is replaced by the positional change of relative positions in the X-axis direction of the linear motors 210, 220.

First, by the first position acquiring unit 11, the positional change in the X-axis direction of the linear motor 210 is acquired based on the detection signal of the first linear scale 251, and the positional change in the X-axis direction of the linear motor 220 is acquired based on the detection signal of the second linear scale 252.

Next, by the second position acquiring unit 12, the positional change in relative position in the X-axis direction of the linear motors 210, 220 is directly acquired based on the detection signal of the third linear scale 253.

Next, by position calculation unit 13, the positional change of relative change in the X-axis direction of the linear motors 210, 220 is calculated based on the respective positional changes in the X-axis direction of the linear motors 210, 220 acquired by the first position acquisition unit 11.

Next, by the difference calculation unit 14, the difference is calculated between the positional change of relative positions in the X-axis direction of the linear motors 210, 220 calculated by the position calculation unit 13, and the positional change of relative positions in the X-axis direction of the linear motors 210, 220 acquired directly by the second position acquiring unit 12.

Then, by the abnormality detection unit 15, abnormality in the industrial machine 200 is detected in the case of the absolute value for the difference calculated by the difference calculation unit 14 exceeding a predetermined threshold. The abnormality detection processing is executed by configuring in the above way.

According to the present embodiment, effects similar to the first embodiment are exerted.

It should be noted that the present disclosure is not to be limited to the above respective embodiments, and modifications and improvements thereto of a scope which can achieve the objects of the present disclosure are encompassed by the present disclosure.

For example, the present disclosure is applicable so long as being a system full closed controlling one axis by a plurality of motors, and is widely applicable to tandem control systems which drive one conventional known driven body, or the like.

In addition, although the above embodiments establish a configuration which detects abnormality in the industrial machine 100 by the abnormality detection unit 15, in the case of the difference calculated by the difference calculation unit 14 being outside a predetermined range, or in a case of the absolute value for the difference calculated by the difference calculation unit 14 exceeding a predetermined threshold, they are not limited thereto. It may be established as a configuration which compares the positional change in the U axis calculated by the position calculation unit 13 and the positional change in the U axis acquired directly by the second position acquiring unit 12, and detects abnormality in the industrial machine 100 based on the results of this comparison.

EXPLANATION OF REFERENCE NUMERALS

1 motor control device
11 first position acquiring unit
12 second position acquiring unit
13 position calculation unit
14 difference calculation unit
15 abnormality detection unit
100 industrial machine
110 spindle motor (motors)
112 rotary encoder (first position detector)
121 spindle gear (gear)
122 base gear (gear)
130 U-axis motor (motors)
132 rotary encoder (first position detector)
141 first U-axis gear (gear)
142 second U-axis gear (gear)
143 third U-axis gear (gear)
152 feed screw gear (gear)
150 feed screw
160 cutting tool (tool)
170 scale (second position detector)
200 industrial machine
210 linear motor (motors)
220 linear motor (motors)
251 first linear scale (first position detector)
252 second linear scale (first position detector)
253 third linear scale (second position detector)

The invention claimed is:

1. A motor control device for full-closed control of one axis by a plurality of motors in an industrial machine, the motor control device comprising:

a first position acquiring unit which acquires a positional change of each motor, based on respective detection signals of a plurality of first position detectors respectively provided to each of the plurality of motors;

a second position acquiring unit which acquires positional change of the one axis based on a detection signal of a second position detector which directly detects positional change of the one axis;

a position calculation unit which calculates positional change in the one axis, based on positional change of respective motors acquired by the first position acquiring unit; and an abnormality detection unit which detects abnormality in the industrial machine, based on positional change in the one axis calculated by the position calculation unit, and positional change in the one axis acquired by the second position acquiring unit, wherein the plurality of motors include a first motor and a second motor, and when the first motor moves the one axis, the second motor is controlled to move at a predetermined ratio relative to a movement amount of the first motor in order to maintain the position of the one axis.

2. The motor control device according to claim 1, further comprising:

a difference calculation unit which calculates a difference between the positional change in the one axis calculated by the position calculation unit, and the positional change in the one axis acquired by the second acquiring unit, wherein the abnormality detection unit detects abnormality in the industrial machine, in a case of the difference calculated by the difference calculation unit being outside a predetermined range, or an absolute value for the difference exceeding a predetermined threshold.

3. The motor control device according to claim 1, wherein the abnormality detection unit produces an alarm when detecting abnormality in the industrial machine.

4. The motor control device according to claim 1, wherein the industrial machine includes:

a plurality of gears which transfer rotational driving force of the plurality of motors; and a feed screw which converts rotational driving force transferred via the plurality of gears into linear driving force of the one axial direction, wherein the position calculation unit calculates positional change of the one axis, based on a gear ratio of the plurality of gears and a lead of the feed screw.

5. The motor control device according to claim 1, wherein the plurality of motors are all linear motors, wherein the first position acquiring unit acquires positional change relative to a machine base for a mobile part of the plurality of linear motors, wherein the second position acquiring unit acquires a relative positional change for the mobile part of the plurality of linear motors, and wherein the position calculation unit calculates a relative positional change in mobile parts of the plurality of linear motors, based on positional change of the mobile parts of the plurality of linear motors relative to a machine based acquired by the first position acquiring unit.

* * * * *